United States Patent
Komuro

(10) Patent No.: US 11,020,945 B2
(45) Date of Patent: Jun. 1, 2021

(54) MULTILAYER STRUCTURE, AND PACKAGING MATERIAL FORMED FROM THE MULTILAYER STRUCTURE

(71) Applicant: MITSUBISHI CHEMICAL CORPORATION, Tokyo (JP)

(72) Inventor: Ryohei Komuro, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/781,268

(22) Filed: Feb. 4, 2020

(65) Prior Publication Data

US 2020/0171806 A1 Jun. 4, 2020

Related U.S. Application Data

(63) Continuation of application No. 15/556,150, filed as application No. PCT/JP2016/058652 on Mar. 18, 2016, now Pat. No. 10,589,493.

(30) Foreign Application Priority Data

Mar. 18, 2015 (JP) ................................. 2015-054224
Mar. 30, 2015 (JP) ................................. 2015-069631

(51) Int. Cl.
| | | |
|---|---|---|
| *B32B 7/02* | (2019.01) | |
| *B32B 27/08* | (2006.01) | |
| *B65D 65/40* | (2006.01) | |
| *B32B 27/28* | (2006.01) | |
| *C08L 29/04* | (2006.01) | |
| *C08K 5/098* | (2006.01) | |
| *B65D 81/24* | (2006.01) | |
| *B32B 27/18* | (2006.01) | |
| *B32B 21/08* | (2006.01) | |
| *B32B 27/36* | (2006.01) | |
| *B32B 27/10* | (2006.01) | |
| *B32B 29/00* | (2006.01) | |
| *B32B 15/08* | (2006.01) | |
| *B32B 5/02* | (2006.01) | |
| *B32B 27/34* | (2006.01) | |
| *B29C 48/16* | (2019.01) | |
| *B32B 7/12* | (2006.01) | |

(Continued)

(52) U.S. Cl.
CPC .............. *B32B 27/08* (2013.01); *B29C 48/16* (2019.02); *B32B 5/022* (2013.01); *B32B 5/024* (2013.01); *B32B 7/12* (2013.01); *B32B 15/08* (2013.01); *B32B 21/08* (2013.01); *B32B 27/10* (2013.01); *B32B 27/18* (2013.01); *B32B 27/20* (2013.01); *B32B 27/28* (2013.01); *B32B 27/306* (2013.01); *B32B 27/32* (2013.01); *B32B 27/34* (2013.01); *B32B 27/36* (2013.01); *B32B 29/002* (2013.01); *B65D 65/16* (2013.01); *B65D 65/40* (2013.01); *B65D 81/24* (2013.01); *C08J 5/124* (2013.01); *C08K 5/098* (2013.01); *C08L 29/04* (2013.01); *B29C 48/08* (2019.02); *B29C 48/21* (2019.02); *B29K 2023/0625* (2013.01); *B29K 2023/086* (2013.01); *B29K 2105/0094* (2013.01); *B29K 2509/00* (2013.01); *B29K 2995/0067* (2013.01); *B29L 2031/712* (2013.01); *B32B 2264/104* (2013.01); *B32B 2270/00* (2013.01); *B32B 2307/412* (2013.01); *B32B 2307/514* (2013.01); *B32B 2307/7242* (2013.01); *B32B 2439/70* (2013.01); *B32B 2439/80* (2013.01); *C08J 2323/26* (2013.01); *C08J 2423/06* (2013.01); *C08J 2429/04* (2013.01)

(58) Field of Classification Search
CPC ................................ C08K 5/098; C08L 29/04
See application file for complete search history.

(56) References Cited

U.S. PATENT DOCUMENTS 4,877,662 A 8/1989 Yazaki et al.
5,344,715 A 9/1994 Negi et al.
(Continued)

FOREIGN PATENT DOCUMENTS

JP 54-87783 7/1979
JP 62-68743 3/1987
(Continued)

OTHER PUBLICATIONS

ISR from WO Application No. PCT/JP2016/058652 dated May 18, 2016.
IPRP from WO Application No. PCT/JP2016/058652 dated Sep. 27, 2017.
Supplementary European Search Report issued in the European Patent Application No. 16765100.9, dated Oct. 12, 2018.
CN OA dated Jun. 6, 2019 issued in CN Patent Application No. 201680014924.4 with English translation.
CN Office Action (dated Sep. 27, 2019) issued for CN Patent Application No. 201680014924.4, with Eng. translation.
(Continued)

*Primary Examiner* — Zachary M Davis
(74) *Attorney, Agent, or Firm* — Greenblum & Bernstein, P.L.C.

(57) ABSTRACT

A multilayer structure is provided, which includes a layer containing a saponified ethylene-vinyl ester copolymer, and a layer of a thermoplastic resin other than the saponified ethylene-vinyl ester copolymer provided on at least one side of the saponified ethylene-vinyl ester copolymer-containing layer with the intervention of an adhesive resin layer. An interface layer having a thickness (X) of 50 to 400 nm is present in an interface between the saponified ethylene-vinyl ester copolymer-containing layer and the adhesive resin layer. Alternatively, a viscosity increase rate in the interface between the saponified ethylene-vinyl ester copolymer-containing layer and the adhesive resin layer is 0.1% to 8%. Therefore, the multilayer structure has long-run durability, and is less liable to have poor appearance even if being produced by a multilayer coextrusion method.

5 Claims, No Drawings

(51) Int. Cl.
  *B32B 27/20*    (2006.01)
  *B32B 27/30*    (2006.01)
  *B32B 27/32*    (2006.01)
  *B65D 65/16*    (2006.01)
  *C08J 5/12*     (2006.01)
  *B29C 48/08*        (2019.01)
  *B29C 48/21*        (2019.01)
  *B29K 23/00*        (2006.01)
  *B29K 105/00*       (2006.01)
  *B29K 509/00*       (2006.01)
  *B29L 31/00*        (2006.01)

(56) References Cited

U.S. PATENT DOCUMENTS

| | | | |
|---|---|---|---|
| 6,432,552 | B1 | 8/2002 | Onishi |
| 6,503,588 | B1 | 1/2003 | Hayashi et al. |
| 2004/0099986 | A1* | 5/2004 | Kannankeril ............ B32B 3/28 264/173.14 |
| 2016/0177080 | A1 | 6/2016 | Hall |

FOREIGN PATENT DOCUMENTS

| | | |
|---|---|---|
| JP | H08-239528 | 9/1996 |
| JP | H08-311276 | 11/1996 |
| JP | S63-230757 | 9/1998 |
| JP | 2000-212344 | 8/2000 |
| JP | 2000265025 | 9/2000 |
| JP | 2001348017 | 12/2001 |
| JP | 2002060496 | 2/2002 |
| JP | 2003054592 | 2/2003 |
| JP | 2004244451 | 9/2004 |
| JP | 2009056708 | 3/2009 |
| JP | 2012153815 | 8/2012 |
| JP | 2012153861 | 8/2012 |
| WO | 2015041135 | 3/2015 |

OTHER PUBLICATIONS

European Office Action issued for counterpart EP Patent Application No. 16765100.9 dated Nov. 25, 2019.

Japanese Office Action issued for counterpart JP Patent Application No. JP2016-054650 dated Nov. 26, 2019.

"Coextrusion die design double number of layers for packaging film and blowmolding parisons," Dec. 31, 2001, Plastics Today, https://www.plasticstoday.com/content/coextrusion-die-design-doubles-number-layers-packaging-film-and-blowmolding-parisons/707082846188, accessed Mar. 28, 2019.

Decision of Refusal issued in JP Application No. 2016-054650, dated Jun. 30, 2020, English translation.

* cited by examiner

MULTILAYER STRUCTURE, AND PACKAGING MATERIAL FORMED FROM THE MULTILAYER STRUCTURE

CROSS-REFERENCE TO RELATED APPLICATIONS

This application is a continuation application of U.S. patent application Ser. No. 15/556,150, filed Sep. 6, 2017, which is a National Stage entry of International Patent Application No. PCT/JP2016/058652, filed Mar. 18, 2016, which claims priority to Japanese Application No. 2015-054224, filed Mar. 18, 2015 and Japanese Application No. 2015-069631, filed Mar. 30, 2015. The disclosures of each of the above-mentioned documents are incorporated herein by reference in their entirety.

TECHNICAL FIELD

The present disclosure relates to a multilayer structure which includes a layer containing a saponified ethylene-vinyl ester copolymer (hereinafter referred to as "EVOH") and a layer of a thermoplastic resin other than the EVOH provided on at least one side of the EVOH-containing layer with the intervention of an adhesive resin layer. The multilayer structure is less liable to have poor appearance even if being produced by a multilayer coextrusion method.

BACKGROUND ART

EVOH is excellent in gas barrier property and transparency and, therefore, is mainly used for a food packaging material. The food packaging material is recently required to be safe particularly for food contained in a package made of the food packaging material. Further, the food packaging material preferably ensures the visibility of the contained food (preferably has higher transparency) so that the contained food can be seen through the food packaging material from the outside.

A sheet, a film or a container as the packaging material may be formed from the EVOH alone. However, it is a general practice to form a multilayer structure including an EVOH layer by stacking a layer of a thermoplastic resin other than the EVOH (other thermoplastic resin) on the EVOH layer with the intervention of an adhesive resin layer in order to impart the packaging material with higher water resistance, higher strength and other functions.

Where the packaging material including the EVOH layer and the thermoplastic resin layer is heat-drawn into a film, a sheet or a container, however, the packaging material is problematically liable to have poor appearance because the EVOH is less stretchable than the other thermoplastic resin. Therefore, it is necessary to improve the stretchability of the EVOH so that the EVOH can follow the stretching of the other thermoplastic resin.

In general, the stretchability of the EVOH tends to be improved as the content of an ethylene structural unit (hereinafter referred to simply as "ethylene content") increases. On the other hand, the gas barrier property of the EVOH tends to be deteriorated as the ethylene content increases. Therefore, it is proposed to use an EVOH having a lower ethylene content and an EVOH having a higher ethylene content in combination to impart the EVOH with both the gas barrier property and the stretchability.

PTL 1, for example, discloses an EVOH composition containing two types of EVOHs having ethylene contents different from each other by 3 to 20 mol % and having a predetermined boron concentration. Further, PTL 1 states that a multilayer film including an intermediate layer made of the EVOH composition and a polypropylene layer provided on the intermediate layer with the intervention of an adhesive resin layer is free from stretching unevenness such as whitening and streaking even if being heat-drawn.

RELATED ART DOCUMENT

Patent Document

PTL 1: JP-A-HEI8(1996)-311276

SUMMARY OF INVENTION

A multilayer structure including an EVOH-containing layer (hereinafter sometimes referred to simply as "EVOH layer") is produced through a multilayer coextrusion method by stacking adhesive resin layers and other thermoplastic resin layers on the EVOH layer. In general, where the EVOH layer serving as the intermediate layer, the adhesive resin layers and the other thermoplastic resin layers are coextruded, the EVOH and the adhesive resin present adjacent to the EVOH are chemically bonded to each other. Thus, an interface layer having a certain thickness is formed in an interface between the EVOH layer and each of the adhesive resin layers. With the interface layer thus formed, the multilayer structure has sufficient mechanical strength (adhesive strength).

However, the resin composition containing the two types of EVOHs and having the predetermined boron concentration as disclosed in PTL 1 tends to have insufficient formability in the multilayer coextrusion in consideration of the recent technological advancement (e.g., a wider variety of feed block die shapes and improvement in coextruder functions). Problematically, this may deteriorate the appearance of the multilayer structure, particularly the transparency of the multilayer structure.

This is supposedly because the interface layer formed in the interface between the EVOH layer and the adhesive resin layer has variations in thickness depending on the combination of the EVOH and the adjacent adhesive resin to complicate the rheology of the coextruded resins for the multilayer structure, and the transparency of the multilayer structure is deteriorated depending on extrusion conditions.

Conventionally, the multilayer structure is evaluated for transparency by a visual evaluation method. However, the multilayer structure produced by the multilayer coextrusion method often fails to satisfy the recent higher transparency requirement based on the recent technological advancement, though the result of the visual transparency evaluation of the multilayer structure is satisfactory.

In the present disclosure, therefore, the transparency evaluation is performed in a more practical manner based on image see-through clarity, i.e., whether an optical image seen through a film formed from the multilayer structure is clear or not.

In view of the foregoing, the present invention provides a multilayer structure which includes a layer of an EVOH and a layer of a thermoplastic resin other than the EVOH provided on at least one side of the EVOH layer with the intervention of an adhesive resin layer. Such a multilayer structure has long-run durability and, even if being produced by the multilayer coextrusion method, is excellent in formability and is less susceptible to deterioration in appearance and, particularly, reduction in image see-through clarity.

In view of the foregoing, the inventor conducted intensive studies on the multilayer structure including the EVOH layer and the layer of the thermoplastic resin other than the EVOH provided on at least one side of the EVOH layer with the intervention of the adhesive resin layer and, as a result, focused on the thickness (X) of an interface layer formed in an interface between the EVOH layer and the adhesive resin layer of the multilayer structure. Where the multilayer structure is produced by the multilayer coextrusion method, for example, the EVOH layer and the adhesive resin layer are chemically bonded to each other in the interface therebetween in a feed blocs to form an interface layer having a certain thickness. The inventor found that, where the thickness of the interface layer formed in the interface between the EVOH layer and the adhesive resin layer is properly controlled, the multilayer structure is less susceptible to the deterioration in appearance, particularly the reduction in image see-through clarity, which may otherwise occur due to the roughening of the interface between the EVOH layer and the adhesive resin layer.

On the other hand, the inventor further conducted intensive studies on the multilayer structure including the EVOH layer and the layer of the thermoplastic resin other than the EVOH provided on at least one side of the EVOH layer with the intervention of the adhesive resin layer and, as a result, focused on the fluidity in the interface between the EVOH layer and the adhesive resin layer. Where the multilayer structure is produced by the multilayer coextrusion method, for example, the EVOH layer and the adhesive resin layer are chemically bonded to each other in the interface therebetween in the feed block. This increases the viscosity in the interface and, hence, the fluidity in the interface is liable to be locally variable. The inventor found that, where the fluidity of the resin in the interface between the EVOH layer and the adhesive resin layer is properly controlled, the multilayer structure is less susceptible to the deterioration in appearance, particularly the reduction in image see-through clarity, which may otherwise occur due to the roughening of the interface between the EVOH layer and the adhesive resin layer.

According to one inventive aspect (first aspect), there is provided a multilayer structure which includes a layer containing an EVOH, a layer of a thermoplastic resin other than the EVOH provided on at least one side of the EVOH-containing layer, and an adhesive resin layer provided between the EVOH-containing layer and the thermoplastic resin layer, wherein an interface layer having a thickness (X) of 50 to 400 nm is present in an interface between the EVOH-containing layer and the adhesive resin layer.

According to another inventive aspect (second aspect), there is provided a multilayer structure which includes a layer containing an EVOH, a layer of a thermoplastic resin other than the EVOH provided on at least one side of the EVOH-containing layer, and an adhesive resin layer provided between the EVOH-containing layer and the thermoplastic resin layer, wherein a viscosity increase rate in an interface between the EVOH-containing layer and the adhesive resin layer is 0.1% to 8%.

According to the present disclosure, the multilayer structure which includes the EVOH-containing layer and the layer of the thermoplastic resin other than the EVOH provided on at least one side of the EVOH-containing layer with the intervention of the adhesive resin layer has long-run durability, and is less susceptible to the deterioration in appearance, which may otherwise occur due to the roughening of the interface between the EVOH-containing layer and the adhesive resin layer. Therefore, the multilayer structure is excellent in appearance and particularly in image see-through clarity.

Where the EVOH (saponified ethylene-vinyl ester copolymer) is a mixture of two or more types of saponified ethylene-vinyl ester copolymers having different ethylene structural unit contents, it is possible to further efficiently produce the multilayer structure which has long-run durability and is less susceptible to the deterioration in appearance, particularly the reduction in image see-through clarity, which may otherwise occur due to the roughening of the interface between the EVOH-containing layer and the adhesive resin layer.

Where the two or more types of saponified ethylene-vinyl ester copolymers have a maximum ethylene structural unit content and a minimum ethylene structural unit content which are different from each other by a difference ($\Delta Et$) of 10 to 25 mol %, the formability and the gas barrier property of the multilayer structure are properly balanced and, therefore, the resulting formed product is highly transparent.

Where the layer containing the EVOH (saponified ethylene-vinyl ester copolymer) further contains 350 to 800 ppm of a zinc salt of a higher fatty acid based on the amount of the saponified ethylene-vinyl ester copolymer, it is easier to control the thickness (X) of the interface layer present in the interface between the EVOH-containing layer and the adhesive resin layer within the predetermined range. Further, it is easier to control the viscosity increase rate in the interface between the EVOH-containing layer and the adhesive resin layer within the predetermined range.

DESCRIPTION OF EMBODIMENTS

The present disclosure will hereinafter be described in detail by way of preferred embodiments thereof but not by way of limitation.

A multilayer structure according to the present disclosure includes a layer of an EVOH and a layer of a thermoplastic resin other than the EVOH provided on at least one side of the EVOH layer with the intervention of an adhesive resin layer. That is, the multilayer structure includes a layer of an EVOH, a layer of a thermoplastic resin other than the EVOH provided on the EVOH layer, and an adhesive resin layer provided between the EVOH layer and the thermoplastic resin layer. The adhesive resin layer is provided on one or each side of the EVOH layer.

First Embodiment Characterized by Thickness (X) of Interface Layer

In a first embodiment of the present disclosure, an interface layer having a thickness (X) of 50 to 400 nm is present in an interface between the EVOH layer and the adhesive resin layer. The thickness (X) of the interface layer is preferably 100 to 380 nm, particularly preferably 200 to 350 nm. If the thickness (X) of the interface layer present in the interface between the EVOH layer and the adhesive resin layer is greater, the multilayer structure is susceptible to deterioration in appearance which may occur due to roughening of the interface between the EVOH layer and the adhesive resin layer when the multilayer structure is produced by the multilayer coextrusion method. If the thickness (X) of the interface layer present in the interface between the EVOH layer and the adhesive resin layer is excessively small, on the other hand, the multilayer structure is liable to have an impractical mechanical strength (adhesive strength).

Where the EVOH layer has plural interfaces with respect to adhesive resin layers, an interface layer present in at least one of the interfaces preferably has a thickness falling within the aforementioned range. It is more preferred that the thicknesses of the respective interface layers all fall within the aforementioned range. Therefore, the expression "an interface layer having a thickness (X) of 50 to 400 nm is present in an interface between the EVOH layer and the adhesive resin layer" means that, where the single interface is present between the EVOH layer and the adhesive resin layer, the interface layer present in the single interface has a thickness of 50 to 400 nm and, where the plural interfaces are respectively present between the EVOH layer and the adhesive resin layers, the interface layer present in at least one of the interfaces has a thickness of 50 to 400 nm.

The thickness (X) of the interface layer present in the interface between the EVOH layer and the adhesive resin layer is measured in the following manner.

Thickness (X) of Interface Layer Present in Interface Between EVOH Layer and Adhesive Resin Layer In this embodiment, the thickness (X) of the interface layer present in the interface between the EVOH layer and the adhesive resin layer is measured by observing a section of the multilayer structure by means of a scanning electron microscope (hereinafter sometimes referred to as "SEM").

The measurement is performed in the following manner, for example, by using a scanning electron microscope JSM-6510LA available from JEOL Ltd.

Observation of Section of Multilayer Structure

A piece having a size of 5 mm×5 mm is cut out from the multilayer structure including the EVOH layer, and a thicknesswise section of the piece is polished by an argon ion beam by means of a cross-section polisher IB-09020CP available from JEOL Ltd. Thus, a specimen is prepared for photographing the section of the multilayer structure. Then, the section of the photographing specimen thus prepared is photographed at a magnification of 5000× by means of the SEM JSM-6510LA available from JEOL Ltd., whereby an image around the interface between the EVOH layer and the adhesive resin layer is obtained.

When the photographing specimen is to be photographed by means of the SEM, the photographing specimen is generally pretreated by platinum vapor deposition. Where a portion of the section of the multilayer structure around the interface between the EVOH layer and the adhesive resin layer is photographed by the SEM without performing the vapor deposition, however, the EVOH (bright part) and the adhesive resin (dark part) are contrasted with respect to each other according to the formulations of the respective layers. Thus, the interface between the EVOH layer and the adhesive resin layer of the multilayer structure can be visualized.

Measurement of Thickness (X) of Interface Layer Present in Interface Between EVOH Layer and Adhesive Resin Layer The thickness (X) of the interface layer present in the interface between the EVOH layer and the adhesive resin layer is determined based on the image obtained in the above manner. More specifically, a line is drawn perpendicularly to the interface (tangent line) between the EVOH layer (bright part) and the adhesive resin layer (dark part) of the multilayer structure in the image obtained in the above manner, and a brightness distribution along the perpendicular line (determined with the brightness plotted as ordinate and the distance plotted as abscissa) is outputted by utilizing image analysis software (e.g., Image-J or the like).

In the present disclosure, two inflection points are determined from the brightness distribution, and a distance between the two inflection points on the abscissa is defined as the thickness (X) of the interface layer present in the interface between the EVOH layer and the adhesive resin layer.

Second Embodiment Characterized by Viscosity Increase Rate

In the present disclosure, a viscosity increase rate in an interface between the EVOH layer and the adhesive resin layer is 0.1 to 8%. The viscosity increase rate is preferably 0.3 to 7%, particularly preferably 0.5 to 6%. If the viscosity increase rate in the interface between the EVOH layer and the adhesive resin layer is greater, the multilayer structure is susceptible to the deterioration in appearance which may be caused due to the roughening of the interface between the EVOH layer and the adhesive resin layer when the multilayer structure is produced by the multilayer coextrusion method. If the viscosity increase rate in the interface between the EVOH layer and the adhesive resin layer is excessively small, on the other hand, the multilayer structure is liable to have an impractical mechanical strength (adhesive strength).

Where the EVOH layer has plural interfaces with respect to adhesive resin layers, the average of viscosity increase rates in the interfaces preferably falls within the aforementioned range. Therefore, the expression "a viscosity increase rate in an interface between the EVOH layer and the adhesive resin layer is 0.1 to 8%" means that, where the single interface is present between the EVOH layer and the adhesive resin layer, the viscosity increase rate in the single interface is 0.1 to 8% and, where the plural interfaces are respectively present between the EVOH layer and the adhesive resin layers, the average of viscosity increase rates in the plural interfaces is 0.1 to 8%.

The viscosity increase rate in the interface between the EVOH layer and the adhesive resin layer is measured in the following manner.

Viscosity Increase Rate in Interface Between EVOH Layer and Adhesive Resin Layer In the present disclosure, the viscosity increase rate in the interface between the EVOH layer and the adhesive resin layer is calculated from the shear viscosities (Pa·s) of the EVOH, the adhesive resin and an EVOH layer/adhesive resin layer stack measured by means of a rotary rheometer.

Shear Viscosities (Pa·s) of EVOH, Adhesive Resin and EVOH Layer/Adhesive Resin Layer Stack In the present disclosure, the shear viscosities (Pa·s) of the EVOH, the adhesive resin and the EVOH layer/adhesive resin layer stack are measured under the following conditions by means of the rotary rheometer.

Measurement Conditions

The measurement is performed in a nitrogen atmosphere at a temperature of 210° C. with a strain of 5%, a frequency of 3 rad/s and a preheating period of 10 minutes with the use of a parallel-parallel plate jig having a diameter of 25 mm.

Determination of Viscosity Increase Rate in Interface Between EVOH Layer and Adhesive Resin Layer The viscosity increase rate in the interface between the EVOH layer and the adhesive resin layer may be determined from expressions (1) and (2) or expressions (3), (4) and (5) depending on the number of layers of the multilayer structure.

Multilayer Structure including Repeated EVOH Layer/Adhesive Resin Layer Stacks (Even Number of Layers $$\eta_{multilayer.calc.} = \phi_{EVOH1}\eta_{EVOH1} + \phi_{Tie1}\eta_{Tie1} + \phi_{EVOH2}\eta_{EVOH2} + \phi_{Tie2}\eta_{Tie2} \ldots + \phi_{EVOH\frac{n}{2}}\eta_{EVOH\frac{n}{2}} + \phi_{Tie\frac{n}{2}}\eta_{Tie\frac{n}{2}} \quad (1)$$

$$\Delta\eta = \frac{\eta_{multilayer.exp.} - \eta_{multilayer.calc.}}{\eta_{multilayer.calc.} \times (n-1)} \times 100 \quad (2)$$

n: The number of layers of a multilayer structure including repeated EVOH layer/adhesive resin layer stacks (n=2, 4, 6 . . . )
$\Delta_\eta[\%]$: The viscosity increase rate in each interface between the EVOH layer and the adhesive resin layer
$\eta_{multilayer.calc.}$[Pa·s]: The shear viscosity of the multilayer structure including the n layers (theoretical value assuming that no viscosity increase is observed in the interface)
$\eta_{multilayer.exp.}$[Pa·s]: The shear viscosity of the multilayer structure including the n layers (experimentally obtained value)
$\phi_{EVOH}$: The volume fraction of the EVOH
$\phi_{Tie}$: The volume fraction of the adhesive resin
$\eta_{EVOH}$[Pa·s]: The shear viscosity of the EVOH
$\eta_{Tie}$[Pa·s]: The shear viscosity of the adhesive resin

Multilayer Structure including Repeated EVOH Layer/Adhesive Resin Layer Stacks (Odd Number of Layers $$\eta_{multilayer.calc.} = \quad (3)$$
$$\phi_{EVOH1}\eta_{EVOH1} + \phi_{Tie1}\eta_{Tie1} + \phi_{EVOH2}\eta_{EVOH2} + \phi_{Tie2}\eta_{Tie2} \ldots + \phi_{EVOH\frac{m-1}{2}}\eta_{EVOH\frac{m-1}{2}} + \phi_{Tie\frac{m-1}{2}}\eta_{Tie\frac{m-1}{2}} + \phi_{EVOH\frac{m-1}{2}}\eta_{EVOH\frac{m+1}{2}}$$

or $$\eta_{multilayer.calc.} = \quad (4)$$
$$\phi_{EVOH1}\eta_{EVOH1} + \phi_{Tie1}\eta_{Tie1} + \phi_{EVOH2}\eta_{EVOH2} + \phi_{Tie2}\eta_{Tie2} \ldots + \phi_{EVOH\frac{m-1}{2}}\eta_{EVOH\frac{m-1}{2}} + \phi_{Tie\frac{m-1}{2}}\eta_{Tie\frac{m-1}{2}} + \phi_{Tie\frac{m+1}{2}}\eta_{Tie\frac{m+1}{2}}$$

$$\Delta\eta = \frac{\eta_{multilayer.exp.} - \eta_{multilayer.calc.}}{\eta_{multilayer.calc.} \times (m-1)} \times 100 \quad (5)$$

m: The number of layers of a multilayer structure including repeated EVOH layer/adhesive resin layer stacks (m=3, 5, 7 . . . )
$\Delta_\eta[\%]$: The viscosity increase rate in each interface between the EVOH layer and the adhesive resin layer
$\eta_{multilayer.calc.}$[Pa·s]: The shear viscosity of the multilayer structure including the m layers (theoretical value assuming that no viscosity increase is observed in the interface)
$\eta_{multilayer.exp.}$[Pa·s]: The shear viscosity of the multilayer structure including the m layers (experimentally obtained value)
$\phi_{EVOH}$: The volume fraction of the EVOH
$\phi_{Tie}$: The volume fraction of the adhesive resin
$\eta_{EVOH}$[Pa·s]: The shear viscosity of the EVOH
$\eta_{Tie}$[Pa·s]: The shear viscosity of the adhesive resin In the case of a double layer structure including the EVOH layer and the adhesive resin layer, for example, the viscosity increase rate in the interface between the EVOH layer and the adhesive resin layer is calculated by inputting n=2 in the expressions (1) and (2) as follows.

Double Layer Structure including EVOH Layer and Adhesive Resin Layer

The viscosity increase rate in the interface between the EVOH layer and the adhesive resin layer is calculated from the following expressions (6) and (7):

$$\eta_{EVOH/Tie.calc.} = \phi_{EVOH}\eta_{EVOH} + \phi_{Tie}\eta_{Tie} \quad (6)$$

$$\Delta\eta = \frac{\eta_{EVOH/Tie.exp.} - \eta_{EVOH/Tie.calc.}}{\eta_{EVOH/Tie.calc.}} \times 100 \quad (7)$$

$\Delta_\eta[\%]$: The viscosity increase rate in the interface between the EVOH layer and the adhesive resin layer
$\eta_{EVOH/Tie.calc.}$[Pa·s]: The shear viscosity of the EVOH layer/adhesive resin layer stack (theoretical value assuming that no viscosity increase is observed in the interface)
$\eta_{EVOH/Tie.exp.}$[Pa·s]: The shear viscosity of the EVOH layer/adhesive resin layer stack (experimentally obtained value)
$\phi_{EVOH}$: The volume fraction of the EVOH
$\phi_{Tie}$: The volume fraction of the adhesive resin
$\eta_{EVOH}$[Pa·s]: The shear viscosity of the EVOH
$\eta_{Tie}$[Pa·s]: The shear viscosity of the adhesive resin The change in the viscosity increase rate in the interface between the EVOH layer and the adhesive resin layer was actually observed over time under the aforementioned measurement conditions. As a result, it was confirmed that the viscosity increase rate in the interface between the EVOH layer and the adhesive resin layer is hardly changed with heating within 1 hour.

Therefore, a specimen of the multilayer structure to be used for the determination of the viscosity increase rate in the interface between the EVOH layer and the adhesive resin layer may be, for example, a multilayer structure produced by the multilayer coextrusion method, a multilayer structure produced by preliminary lamination, or a multilayer structure produced by stacking material films or sheets on the rotary rheometer.

In the present disclosure, a multilayer structure produced by stacking an EVOH sheet and an adhesive resin sheet on the rotary rheometer is used for the measurement of the viscosity increase rate in the interface between the EVOH layer and the adhesive resin layer.

The multilayer structure will hereinafter be described.

EVOH

The EVOH to be used in the present disclosure is a water-insoluble thermoplastic resin prepared by saponifying a copolymer of ethylene and a vinyl ester monomer (ethylene-vinyl ester copolymer). A known polymerization method such as a solution polymerization method, a suspension polymerization method or an emulsion polymerization method may be utilized for the preparation of the EVOH. In general, a solution polymerization method using a lower alcohol such as methanol as a solvent is utilized. The saponification of the resulting ethylene-vinyl ester copolymer may be achieved by a known method. The EVOH thus prepared mainly contains an ethylene-derived structural unit and a vinyl alcohol structural unit, and further contains a small amount of a vinyl ester structural unit left unsaponified.

Vinyl acetate is typically used as the vinyl ester monomer because of its commercial availability and its higher impurity removal efficiency in the preparation. Other examples of the vinyl ester monomer include: aliphatic vinyl esters such as vinyl formate, vinyl propionate, vinyl valerate, vinyl butyrate, vinyl isobutyrate, vinyl pivalate, vinyl caproate, vinyl laurate, vinyl stearate and vinyl versatate; and aromatic vinyl esters such as vinyl benzoate. The aliphatic vinyl esters typically have a carbon number of 3 to 20, preferably 4 to 10, particularly preferably 4 to 7. These vinyl ester monomers may be typically each used alone but, as required, may be used in combination.

The EVOH typically has an ethylene content of 20 to 60 mol %, preferably 25 to 50 mol %, particularly preferably 25 to 35 mol %, as measured in conformity with ISO14663. If the ethylene content is excessively low, the EVOH tend to be poorer in high-humidity gas barrier property and melt-formability. If the ethylene content is excessively high, on the other hand, the EVOH tends to be poorer in gas barrier property.

The saponification degree of the vinyl ester in the EVOH is typically 90 to 100 mol %, preferably 95 to 100 mol %, particularly preferably 99 to 100 mol %, as measured in conformity with JIS K6726 (by using a solution of the EVOH prepared by homogeneously dissolving the EVOH in a water/methanol solvent). If the saponification degree is excessively low, the EVOH tends to be poorer in gas barrier property, heat stability, moisture resistance and the like.

The EVOH typically has a melt flow rate (MFR) of 0.5 to 100 g/10 minutes, preferably 1 to 50 g/10 minutes, particularly preferably 3 to 35 g/10 minutes, as measured at 210° C. with a load of 2,160 g. If the MFR is excessively high, the EVOH tends to be poorer in film formability. If the MFR is excessively low, the EVOH tends to have an excessively high melt viscosity, making the melt-extrusion difficult.

The EVOH to be used in the present disclosure may contain a structural unit derived from any of the following comonomers in addition to the ethylene structural unit, the vinyl alcohol structural unit (including the unsaponified vinyl ester structural unit). The comonomers include: α-olefins such as propylene, isobutene, α-octene, α-dodecene and α-octadecene; hydroxyl-containing α-olefins such as 3-butene-1-ol, 4-pentene-1-ol and 3-butene-1,2-diol, and esterification products and acylation products of these hydroxyl-containing α-olefins; unsaturated carboxylic acids, and salts, partial alkyl esters, full alkyl esters, nitriles, amides and anhydrides of the unsaturated carboxylic acids; unsaturated sulfonic acids and salts of the unsaturated sulfonic acids; vinyl silane compounds; vinyl chloride; and styrene.

Post-modified EVOH resins such as a urethanized EVOH resin, an acetalized EVOH resin, a cyanoethylated EVOH resin and an oxyalkylenated EVOH resin are also usable.

Of the aforementioned modification products, an EVOH containing a primary hydroxyl group incorporated in a side chain thereof by copolymerization is preferred for proper secondary formability in a drawing process, a vacuum pressure forming process and the like. Particularly, an EVOH having a 1,2-diol structure in its side chain is preferred.

The EVOH to be used in the present disclosure may contain additives which are generally added to the EVOH, as long as the effects of the present disclosure are not impaired. Examples of the additives include a heat stabilizer, an antioxidant, an antistatic agent, a colorant, a UV absorber, a lubricant, a plasticizer, a light stabilizer, a surfactant, an antibacterial agent, a drying agent, an anti-blocking agent, a flame retarder, a crosslinking agent, a curing agent, a blowing agent, a nucleating agent, an anti-fogging agent, a biodegradation agent, a silane coupling agent and an oxygen absorbing agent.

The heat stabilizer is used for improvement of heat stability and other physical properties of the EVOH in a melt-forming process. Examples of the heat stabilizer include: organic acids such as acetic acid, propionic acid, butyric acid, lauric acid, stearic acid, oleic acid and behenic acid, and alkali metal salts (sodium salts, potassium salts and the like), alkali earth metal salts (calcium salts, magnesium salts and the like) and zinc salts of these organic acids; and inorganic acids such as sulfuric acid, sulfurous acid, carbonic acid, phosphoric acid and boric acid, and alkali metal salts (sodium salts, potassium salts and the like), alkali earth metal salts (calcium salts, magnesium salts and the like) and zinc salts of these inorganic acids.

The EVOH to be used in the present disclosure may be a mixture with other different type of EVOH. Examples of the other type of EVOH include EVOHs having a different ethylene content, a different saponification degree, a different melt flow rate (MFR) (as measured at 210° C. with a load of 2,160 g), a different comonomer unit and/or a different modification degree (e.g., a different 1,2-diol structural unit content).

In the present disclosure, two or more types of EVOHs having different ethylene contents are preferably used for the EVOH layer. In this case, the multilayer structure can be efficiently produced, which has long-run durability and is less susceptible to the deterioration in appearance, particularly the reduction in image see-through clarity, which may otherwise occur due to the roughening of the interface between the EVOH layer and the adhesive resin layer when the multilayer structure is produced by the multilayer coextrusion method.

Particularly, the maximum ethylene structural unit content and the minimum ethylene structural unit content of the two or more types of EVOHs having different ethylene contents are preferably different from each other by a difference (ΔEt) of 10 to 25 mol %, more preferably 10 to 23 mol %, particularly preferably 10 to 20 mol %. If the difference in ethylene content is excessively small, it will be difficult to balance the formability and the gas barrier property of the multilayer structure. If the difference in ethylene content is excessively great, the two or more types of EVOHs are less compatible to each other. Therefore, a product produced from the inventive multilayer structure by a secondary forming process is liable to suffer from streaking or have a lower transparency due to a difference in elongation percentage.

In the following description, two types of EVOHs are used. Where three or more types of EVOHs are used, the EVOHs except a maximum ethylene content EVOH and a minimum ethylene content EVOH may have an ethylene structural unit content falling within the range described above.

The use of the two types of EVOHs will hereinafter be described by way of example.

The two types of EVOHs to be used in combination in the present disclosure are selected from the aforementioned EVOHs. Particularly, the two types of EVOHs to be used in combination have ethylene contents which are different from each other by a difference (ΔEt) of 10 to 25 mol %, preferably 10 to 23 mol %, particularly preferably 10 to 20 mol %. If the difference in ethylene content is excessively small, it will be difficult to balance the formability and the gas barrier property of the multilayer structure. If the difference in ethylene content is excessively great, the two types of EVOHs are less compatible to each other. Therefore, a product produced from the resulting multilayer structure by the secondary forming process is liable to suffer from streaking due to a difference in elongation percentage. This makes it difficult to provide a transparent formed product.

More specifically, it is preferred to use an EVOH (A1) having a lower ethylene content (lower ethylene content EVOH) and an EVOH (A2) having a higher ethylene content (higher ethylene content EVOH) in combination as will be described below.

The lower ethylene content EVOH (A1) has an ethylene content of 20 to 40 mol %, preferably 22 to 38 mol %, particularly preferably 25 to 33 mol %. If the ethylene content is excessively low, the resulting EVOH resin composition is liable to have a decomposition temperature and a melting point that are excessively close to each other. This makes it difficult to melt-form the EVOH resin composition. If the ethylene content is excessively high, on the other hand, the gas barrier property imparting effect of the lower ethylene content EVOH (A1) tends to be reduced.

The lower ethylene content EVOH (A1) typically has a vinyl ester saponification degree of not lower than 90 mol %, preferably 95 to 99.99 mol %, particularly preferably 98 to 99.99 mol %. If the saponification degree is excessively low, the gas barrier property imparting effect of the lower ethylene content EVOH (A1) tends to be reduced.

The lower ethylene content EVOH (A1) typically has a melt flow rate (MFR) of 1 to 100 g/10 minutes, preferably 3 to 50 g/10 minutes, particularly preferably 3 to 10 g/10 minutes (as measured at 210° C. with a load of 2,160 g). If the MFR is excessively high, a product formed from the resulting multilayer structure tends to have a lower mechanical strength. If the MFR is excessively low, the EVOH resin composition is liable to have a reduced extrudability.

The higher ethylene content EVOH (A2) typically has an ethylene content of 40 to 60 mol %, preferably 42 to 56 mol %, particularly preferably 44 to 53 mol %. If the ethylene content is excessively low, the stretchability improving effect of the higher ethylene content EVOH (A2) tends to be reduced, thereby deteriorating the secondary formability. If the ethylene content is excessively high, on the other hand, it is necessary to increase the ethylene content of the lower ethylene content EVOH (A1) in order to control the ethylene content difference within the predetermined range. As a result, the EVOH layer tends to be poorer in gas barrier property.

The higher ethylene content EVOH (A2) typically has a vinyl ester saponification degree of not lower than 90 mol %, preferably 93 to 99.99 mol %, particularly preferably 98 to 99.99 mol %. If the saponification degree is excessively low, the higher ethylene content EVOH (A2) tends to be poorer in gas barrier property.

The higher ethylene content EVOH (A2) typically has a melt flow rate (MFR) of 1 to 100 g/10 minutes, preferably 3 to 50 g/10 minutes, particularly preferably 3 to 30 g/10 minutes (as measured at 210° C. with a load of 2,160 g). If the MFR is excessively high, a product formed from the resulting multilayer structure tends to have a lower mechanical strength. If the MFR is excessively low, the EVOH resin composition is liable to have a reduced extrudability.

The blend ratio (weight ratio) (A1/A2) between the lower ethylene content EVOH (A1) and the higher ethylene content EVOH (A2) is typically 90/10 to 60/40, preferably 85/15 to 65/35, particularly preferably 80/20 to 70/30. If the proportion of the lower ethylene content EVOH (A1) is excessively small, the EVOH composition layer tends to be poorer in gas barrier property. If the proportion of the lower ethylene content EVOH (A1) is excessively great, the stretchability improving effect of the higher ethylene content EVOH (A2) tends to be reduced.

Adhesive Resin

The adhesive resin to be used in the present disclosure will be described.

A known adhesive resin may be used as the adhesive resin. The adhesive resin to be used is properly selected, depending on the type of a base resin (thermoplastic resin to be described later). Typical examples of the adhesive resin include carboxyl-containing modified olefin resins prepared by chemically bonding an unsaturated carboxylic acid or its anhydride to a polyolefin resin by an addition reaction, a graft reaction or the like. Of these carboxyl-containing modified olefin resins, a maleic anhydride-modified polyolefin is preferred as the adhesive resin. The maleic anhydride-modified polyolefin is preferably used in combination with a polyolefin, particularly a linear low-density polyethylene or a polypropylene.

Specific examples of the maleic anhydride-modified polyolefin include polyethylenes graft-modified with maleic anhydride, polypropylenes graft-modified with maleic anhydride, ethylene-propylene (block or random) copolymers graft-modified with maleic anhydride, ethylene-ethyl acrylate copolymers graft-modified with maleic anhydride and ethylene-vinyl acetate copolymers graft-modified with maleic anhydride, which may be used alone or in combination as a mixture. An EVOH other than the EVOH to be used for formation of the EVOH layer in the present disclosure, a rubber/elastomer such as a polyisobutylene or an ethylene-propylene rubber, a polyolefin resin or the like may be blended with any of these adhesive resins. For improvement of the adhesiveness, it is particularly useful to blend an adhesive resin containing a polyolefin resin different from the base polyolefin resin of the adhesive resin.

The maleic anhydride-modified polyolefin typically has an absorbance ratio (α/β) of 0.005 to 0.5, preferably 0.01 to 0.1, particularly preferably 0.03 to 0.06. If the absorbance ratio (α/β) is excessively high, the multilayer structure tends to have a reduced transparency. If the absorbance ratio (α/β) is excessively low, the multilayer structure tends to have a reduced mechanical strength (adhesive strength).

The absorbance ratio (α/β) is determined from an absorbance (α) attributable to C=O stretching vibration observed at around 1710 $cm^{-1}$ and an absorbance (β) attributable to C—H bending vibration observed at around 1450 $cm^{-1}$ in infrared spectroscopy (IR), and serves as an index of the maleic anhydride content of the maleic anhydride-modified polyolefin. A higher absorbance ratio means a greater maleic anhydride content.

Determination of Absorbance Ratio (α/β) of Maleic Anhydride-Modified Polyolefin

The maleic anhydride-modified polyolefin is dried with heating at 100° C. for 3 hours, and sliced into a thin film (having a thickness of 90 μm) by means of a microtome. Light transmitted through the thin film thus obtained is analyzed by means of a Fourier transform infrared spectrometer (FT-IR) to determine the absorbance ratio (α/β) from an absorbance (α) measured at around 1710 cm$^{-1}$ and an absorbance (β) measured at around 1450 cm$^{-1}$.

Other Thermoplastic Resin

The other thermoplastic resin to be used in the present disclosure will be described. In the present disclosure, a thermoplastic resin other than the EVOH may be used as the other thermoplastic resin.

Examples of the other thermoplastic resin (hereinafter sometimes referred to as "base resin") include: polyolefins such as polyethylenes including linear low-density polyethylenes, low-density polyethylenes, very-low-density polyethylenes, medium-density polyethylenes and high-density polyethylenes, polypropylenes, ethylene-propylene (block and random) copolymers, propylene-α-olefin (C4 to C20 α-olefin) copolymers, polybutenes and polypentenes; graft-modified polyolefins obtained by graft-modifying any of the aforementioned polyolefins with an unsaturated carboxylic acid or an unsaturated carboxylate; ionomers and ethylene-vinyl compound copolymers such as ethylene-vinyl acetate copolymers, ethylene-acrylic acid copolymers and ethylene-acrylate copolymers; polyester resins; polyamide resins (including amide copolymers); halogenated polyolefins such as polyvinyl chlorides, polyvinylidene chlorides, chlorinated polyethylenes and chlorinated polypropylenes; vinyl ester resins; elastomers such as polyester elastomers and polyurethane elastomers; acryl resins; polystyrenes; and aromatic and aliphatic polyketones, and polyalcohols obtained by reducing the polyketones. Of these thermoplastic resins, the polyolefin resins and the polyamide resins are preferred, and the polyethylenes and polypropylenes are particularly preferred for the practicality and the physical properties (particularly strength) of the multilayer structure.

In the present disclosure, the very-low-density polyethylenes each have an average density of 0.870 to 0.909 g/cm$^3$, and the low-density polyethylenes each have an average density of 0.910 to 0.925 g/cm$^3$. The medium-density polyethylenes each have an average density of 0.926 to 0.940 g/cm$^3$, and the high-density polyethylenes each have an average density of not less than 0.941 g/cm$^3$.

The base resin may contain an antioxidant, an antistatic agent, a lubricant, a nucleating agent, an antiblocking agent, an UV absorber, a wax and the like.

Multilayer Structure

Where the multilayer structure is configured to include the EVOH layer a (a1, a2, . . . ), the adhesive resin layer b (b1, b2, . . . ) and the thermoplastic resin layer c (c1, c2, . . . ), for example, possible combinations of these layers include a/b/c, c1/b/a/c2, c/a1/b2/a2, c1/b1/a/b2/c2, c1/a1/b/a2/c2, c1/b1/a1/b2/a2/b3/c2 and the like. Where the multilayer structure is configured to include a recycle layer R (R1, R2, . . . ) obtained by recycling cutoff pieces and defective products occurring during the production of the multilayer structure and melt-forming the recycled material (a mixture including the EVOH, the adhesive resin and the thermoplastic resin), the possible combinations of these layers include c/R/b/a, c/R/a1/b/a2, c1/R/a/b/c2, c/R1/a1/b/a2/R2, c1/R1/b1/a/b2/R2/c2, c1/R1/a1/b/a2/R2/c2 and the like.

The thicknesses of the EVOH layer, the thermoplastic layer and the adhesive resin layer of the multilayer structure are properly selected depending on the layer configuration, the type of the EVOH, the type of the thermoplastic resin, the type of the adhesive resin, and the use purpose, the packaging configuration and the required physical properties of the multilayer structure.

The thickness of the EVOH layer is typically 0.1 to 500 μm, preferably 0.1 to 250 μm, particularly preferably 0.1 to 100 μm, though depending on the required gas barrier property. If the thickness of the EVOH layer is excessively small, it will be impossible to impart the multilayer structure with a sufficient gas barrier property. If the thickness of the EVOH layer is excessively great, a film formed from the multilayer structure tends zo be poorer in flexibility.

The thickness of the thermoplastic layer is typically 0.1 to 5000 μm, preferably 1 to 1000 μm, and the thickness of the adhesive resin layer is typically 0.1 to 500 μm, preferably 1 to 250 μm.

A thickness ratio between the EVOH layer and the thermoplastic resin layer of the multilayer structure (if the EVOH layer includes a plurality of EVOH layers and the thermoplastic resin layer includes a plurality of thermoplastic resin layers, a thickness ratio between the thickest one of the EVOH layers and the thickest one of the thermoplastic resin layers) is typically 1/99 to 50/50, preferably 5/95 to 45/55, particularly preferably 10/90 to 40/60. A thickness ratio between the EVOH layer and the adhesive resin layer of the multilayer structure (if the EVOH layer includes a plurality of EVOH layers and the adhesive resin layer includes a plurality of adhesive resin layers, a thickness ratio between the thickest one of the EVOH layers and the thickest one of the adhesive resin layers) is typically 10/90 to 99/1, preferably 20/80 to 95/5, particularly preferably 30/70 to 90/10.

A thickness ratio between the thermoplastic resin layer and the adhesive resin layer of the multilayer structure (if the thermoplastic resin layer includes a plurality of thermoplastic resin layers and the adhesive resin layer includes a plurality of adhesive resin layers, a thickness ratio between the thickest one of the thermoplastic resin layers and the thickest one of the adhesive resin layers) is typically 99/1 to 50/50, preferably 95/5 to 55/45, particularly preferably 90/10 to 60/40.

A known stacking method may be employed for stacking the EVOH layer, the adhesive resin layer and the thermoplastic resin layer. The EVOH layer and the adhesive resin layer may be stacked together, for example, by layering the EVOH and the adhesive resin together in a device by the multilayer coextrusion method. Specific examples of the stacking method include a method in which the respective layers are combined together by means of a feed block and then formed into a predetermined product width in a die, a method in which the respective layers are formed as each having a predetermined product width by means of a multi-manifold die and then combined together, and a method in which the EVOH layer and the adhesive resin layer are stacked together by either of the aforementioned methods and then the resulting stack is spread on the other base resin layer. In consideration of the costs and the environment, the multilayer coextrusion method is preferably used for coextruding the EVOH, the adhesive resin and the thermoplastic resin for formation of the EVOH layer, the adhesive resin layer and the thermoplastic resin layer stacked together.

According to the first embodiment of the present disclosure, the thickness (X) of the interface layer present in the interface between the EVOH layer and the adhesive resin layer is required to be 50 to 400 nm. Particularly, where the multilayer structure is produced by the multilayer coextrusion method, it is important to satisfy the requirement for the thickness (X) of the interface layer present in the interface.

According to the second embodiment of the present disclosure, the viscosity increase rate in the interface between the EVOH layer and the adhesive resin layer is required to be 0.1 to 8%. Particularly, where the multilayer structure is produced by the multilayer coextrusion method, it is important to satisfy the requirement for the viscosity increase rate.

In order to satisfy the requirement of the first embodiment that the thickness (X) of the interface layer present in the interface between the EVOH layer and the adhesive resin layer falls within the predetermined range or the requirement of the second embodiment that the viscosity increase rate in the interface between the EVOH layer and the adhesive resin layer falls within the predetermined range, the following methods may be employed in combination, not by way of limitation.

(1) The adjustment of the thickness (X) of the interface layer present in the interface between the EVOH layer and the adhesive resin layer or the adjustment of the viscosity increase rate in the interface between the EVOH layer and the adhesive resin layer by controlling the properties of the EVOH layer.

For example, the molecular weight, particularly the MFR, the ethylene content and the saponification degree of the EVOH are variably controlled, or a plurality of EVOHs are used in combination for the adjustment. However, other properties such as the formability and the gas barrier property of the multilayer structure are also significantly varied. Therefore, when this method is employed, the other properties should be taken into consideration. In this case, an additive that is effective to adjust the thickness (X) of the interface layer present in the interface between the EVOH layer and the adhesive resin layer (or to adjust the viscosity increase rate in the interface between the EVOH layer and the adhesive resin layer) is preferably used in a very small amount so as not to affect the other properties.

Examples of the additive are as follows:

(i) A polyamide resin reactive with the EVOH is added.

(ii) An adhesive resin reactive with the EVOH (typically, a carboxyl-containing modified olefin polymer obtained by chemically bonding an unsaturated carboxylic acid or its anhydride to a polyolefin resin by an addition reaction, a graft reaction or the like, or a modified ethylene vinyl acetate copolymer (EVA)) is added. Specific examples of the unsaturated carboxylic acid and its anhydride include maleic acid, fumaric acid, itaconic acid, maleic anhydride, itaconic anhydride, monomethyl maleate, monoethyl maleate and diethyl maleate, among which maleic anhydride is particularly preferred.

(iii) A nonreactive compatibilizer (e.g., a thermoplastic styrene elastomer (SBS) or a hydrogenated thermoplastic styrene elastomer (SEBS) for reduction of interfacial tension) is added.

(iv) A reactive compatibilizer (e.g., a polymer having a functional group, such as an acid anhydride group, a carboxylic acid group, an epoxy group or an oxazoline group, reactive with the hydroxyl group of the EVOH, or a copolymer containing the polymer for reduction of interfacial tension) is added.

(v) An ionomer is added.

(vi) An acid such as acetic acid, boric acid or phosphoric acid, or a metal salt such as an alkali metal salt, an alkali earth metal salt or a transition metal salt of the acid is added.

(vii) A metal salt of a higher fatty acid such as a zinc salt of a higher fatty acid is added.

(2) The adjustment of the thickness (X) of the interface layer present in the interface between the EVOH layer and the adhesive resin layer or the adjustment of the viscosity increase rate in the interface between the EVOH layer and the adhesive resin layer by controlling the properties of the adhesive resin layer.

For example, an adhesive resin having a different molecular weight or a resin having a different formulation is added, or the acid modification degree is variably controlled.

Besides, an additive that is effective to adjust the thickness (X) of the interface layer present in the interface between the EVOH layer and the adhesive resin layer (or to adjust the viscosity increase rate in the interface between the EVOH layer and the adhesive resin layer) may be added in a very small amount to the adhesive resin.

Examples of the additive to be added are as follows:

(i) An EVOH is added.

(ii) A polyamide resin reactive with the EVOH is added.

(iii) An adhesive resin reactive with the EVOH (typically, a carboxyl-containing modified olefin polymer obtained by chemically bonding an unsaturated carboxylic acid or its anhydride to a polyolefin resin by an addition reaction, a graft reaction or the like, or a modified ethylene vinyl acetate copolymer (EVA)) is added. Specific examples of the unsaturated carboxylic acid and its anhydride include maleic acid, fumaric acid, itaconic acid, maleic anhydride, itaconic anhydride, monomethyl maleate, monoethyl maleate and diethyl maleate, among which maleic anhydride is particularly preferred.

(iv) A nonreactive compatibilizer (e.g., a thermoplastic styrene elastomer (SBS) or a hydrogenated thermoplastic styrene elastomer (SEBS) for reduction of interfacial tension) is added.

(v) A reactive compatibilizer (e.g., a polymer having a functional group, such as an acid anhydride group, a carboxyl acid group, an epoxy group or an oxazoline group, reactive with the hydroxyl group of the EVOH, or a copolymer containing the polymer for reduction of interfacial tension) is added.

(vi) An ionomer is added.

(vii) An acid such as acetic acid, boric acid or phosphoric acid or a metal salt such as an alkali metal salt, an alkali earth metal salt or a transition metal salt of the acid is added.

(viii) A metal salt of a higher fatty acid such as a zinc salt of a higher fatty acid is added.

Among these methods for the adjustment of the thickness (X) of the interface layer present in the interface between the EVOH layer and the adhesive resin layer or for the adjustment of the viscosity increase rate in the interface between the EVOH layer and the adhesive resin layer, it is preferred to employ two or more types of EVOHs having ethylene contents that are different from each other by a difference ($\Delta Et$) of 10 to 25 mol %, and add a relatively great amount of a metal salt of a higher fatty acid (particularly, a zinc salt of a higher fatty acid) to the resulting EVOH mixture to adjust the thickness (X) of the interface layer present in the intended interface between the EVOH layer and the adhesive resin layer within the predetermined range or to adjust the viscosity increase rate in the intended interface between the EVOH layer and the adhesive resin layer within the aforementioned range.

Examples of the higher fatty acid for the higher fatty acid metal salt include fatty acids having a carbon number of not less than 8, preferably 12 to 30, more preferably 12 to 20. Specific examples of the higher fatty acid include lauric acid, tridecylic acid, myristic acid, pentadecylic acid, palmitic acid, heptadecylic acid, stearic acid, nonadecanoic acid, oleic acid, capric acid, behenic acid and linoleic acid, among which stearic acid, oleic acid or lauric acid is preferably used.

With the use of the higher fatty acid metal salt, the multilayer coextrudability of the resin composition containing the two types of EVOHs having an ethylene content difference ($\Delta Et$) of 10 to 25 mol % is improved. That is, the reduction in image see-through clarity can be suppressed. Even if the multilayer structure is subjected to a diameter expansion process by applying different tensions in different directions thereto by a vacuum pressure forming method, for example, the resulting formed product is less liable to suffer from streaking.

Though the reason for the suppression of the streaking is not clarified, it is supposedly because the higher fatty acid metal salt moderately reduces the thickness of the interface layer present in the interface between the EVOH layer and the adhesive resin layer and suppresses minute interface roughening which may otherwise occur when the EVOH, the adhesive resin and the other resin are coextruded.

Where the higher fatty acid metal salt is added to the EVOH, the proportion of the higher fatty acid metal salt is typically 350 to 800 ppm, preferably 400 to 750 ppm, particularly preferably 450 to 700 ppm, based on the amount of the EVOH. If the proportion of the higher fatty acid metal salt is excessively small, the appearance deterioration preventing effect tends to be reduced and, in some case, the transparency of the multilayer structure is impaired. In general, the higher fatty acid metal salt accelerates the decomposition of the melted EVOH. Therefore, if the concentration of the higher fatty acid metal salt is excessively high, the EVOH is liable to be decomposed to general gas, thereby adversely influencing the production of the multilayer structure by the melt-forming method or the coextrusion method.

Other Additives

The EVOH layer to be used for the multilayer structure in the present disclosure may contain known additives such as a plasticizer, a filler, an anti-blocking agent, an antioxidant, a colorant, an antistatic agent, a UV absorber and a lubricant in proper amounts (e.g., not greater than 1 weight %), as long as the additives impair the effects of the present disclosure.

Preparation of EVOH Composition

For the preparation of an EVOH composition to be used for the multilayer structure according to the present disclosure, the EVOH and the higher fatty acid metal salt are blended in predetermined proportions, for example, by a melt-kneading method or the like, or simply by a dry-blending method.

The dry-blending method is preferred for suppressing the decomposition of the melted EVOH which may be caused by the higher fatty acid metal salt. That is, the higher fatty acid metal salt is preferably allowed to adhere to pellet surfaces of the EVOH by the dry-blending method for the preparation of the EVOH composition.

In the dry-blending method, the higher fatty acid metal salt may be simply dry-blended with the EVOH. Where the two or more types of EVOHs are used, for example, the two or more types of EVOHs are first dry-blended and then the higher fatty acid metal salt is blended with the resulting dry-blend EVOH mixture, or the two or more types of EVOHs are first compounded and then the higher fatty acid metal salt is dry-blended with the resulting compound EVOH mixture. Further, the two or more types of EVOHs and the higher fatty acid metal salt are dry-blended together.

Some of the EVOHs and the higher fatty acid metal salt are dry-blended and then the rest of the EVOHs is blended with the resulting dry-blend mixture, or some of the EVOHs and the higher fatty acid metal salt are compounded and then the rest of the EVOHs is blended with the resulting compound mixture.

A dry-blend mixture of some of the EVOHs and the higher fatty acid metal salt may be blended with a dry-blend mixture of the rest of the EVOHs and the higher fatty acid metal salt. A compound mixture of some of the EVOHs and the higher fatty acid metal salt may be blended with a compound mixture of the rest of the EVOHs and the higher fatty acid metal salt.

Use of Multilayer Structure

The multilayer structure having the aforementioned configuration is typically subjected to a heat-drawing process for use. In the present disclosure, the EVOH layer has an excellent gas barrier property to serve as a gas barrier layer, and suppresses the roughening of the interface. Therefore, various known heat-drawing processes can be employed for processing the multilayer structure.

Specific examples of the processes include a uniaxial stretching process and a biaxial stretching process in which the width of the multilayer structure is expanded by holding opposite edges of the multilayer structure; a drawing process in which the multilayer structure is softened with heating to be drawn into a bottomed container with the use of a press or the like; a vacuum forming process, a pressure forming process and a vacuum pressure forming process in which the multilayer structure is brought into intimate contact with a die by vacuum suction, pressurized air blowing or the like; and a tubular drawing process and a draw blowing process in which a preform such as a parison of the multilayer structure is drawn.

The multilayer structure including the EVOH layer according to the present disclosure has excellent heat-stretchability with reduced unevenness in an interface between two adjacent layers. Therefore, the multilayer structure is suitable not only for the uniaxial stretching process and the biaxial stretching process which involves sequential stretching in different directions, but also for a drawing process and a blowing process in which the multilayer structure is brought into intimate contact with a die to be simultaneously radially stretched.

When the heat-drawing process is performed, the temperature of the multilayer structure (the ambient temperature around the multilayer structure) is typically 40° C. to 300° C., preferably about 50° C. to about 160° C. The draw ratio (area ratio) is typically 2 to 50, preferably 2 to 10.

The multilayer structure is preferably uniformly heated by a hot air oven and/or a heater oven, and the heating method is properly selected according to the type of the drawing process.

The multilayer structure produced by the multilayer coextrusion process and the heat-drawing process may be further coated with other base material by extrusion, or may be further laminated with a film or a sheet of other base material with the use of an adhesive resin. Not only the thermoplastic resin described above as the base resin but also a less stretchable base material (paper, a metal foil, a woven fabric, a nonwoven fabric, a flocculent metal, a woody material or the like) may be used as the base material. Further, the multilayer structure may be formed with an inorganic layer of a metal or a metal oxide by vapor deposition.

Containers such as bags, cups, trays, tubes and bottles produced from a film, a sheet or a stretched film formed from the multilayer structure in the aforementioned manner are useful as packaging materials, containers and lids for general foods, condiments such as mayonnaise and dressing, fermented foods such as miso, fat and oil such as salad oil, beverages, cosmetics and medicines.

Production by Secondary Forming Process such as Vacuum Forming Process or Pressure Forming Process The multilayer structure according to the present disclosure is particularly suitable as a material for bottomed containers such as cups and trays to be produced by the secondary forming process such as the vacuum forming process or the pressure forming process. The multilayer structure according to the present disclosure is substantially free from minute uneven resin flow in the interface during the secondary forming process and, therefore, the product produced from the multilayer structure by the secondary forming process has excellent appearance.

The shapes of the bottomed containers are not particularly limited, but examples of the bottomed containers include a cylindrical bottomed container, a square tubular bottomed container, a profiled bottomed container, a conical bottomed container having a diameter progressively reduced or increased from a mouth to a bottom thereof, a pyramidal bottomed container having a mouth area smaller than a bottom area thereof, a semispherical container, and a stepped bottomed container having a size reduced stepwise from a mouth to a bottom thereof as including two steps. These containers may be each formed with a flange or a projection.

Particularly, where a product such as a cup or a tray to be formed from the multilayer structure has a draw ratio of 0.1 to 3 (product depth (mm)/maximum product diameter (mm)), a vacuum pressure forming process involving deep drawing is employed. In the vacuum pressure forming process, different tensions are generally applied to a sidewall resin portion and a bottom resin portion of the cup-shaped product, making it difficult to impart the product with excellent appearance. Where the multilayer structure according to the present disclosure is used, in contrast, a cup-shaped product having a proper gas barrier property and an excellent appearance can be produced by the vacuum pressure forming process in which different tensions are locally applied to the multilayer structure.

In the heat-softening step, the heating temperature of the multilayer structure (the ambient temperature around the multilayer structure) is typically 40° C. to 300° C., preferably 50° C. to 170° C., particularly preferably 60° C. to 160° C. If the heating temperature is excessively low, the softening tends to be insufficient, making it impossible to impart the formed product with excellent appearance. If the heating temperature is excessively high, it will be impossible to properly balance the melt viscosities of the respective layers, making it impossible to impart the formed product with excellent appearance.

The heating period is defined as a period that permits the multilayer structure to be heated to a temperature at which the multilayer structure is softened into a state necessary and sufficient for the forming. The heating period is properly determined in consideration of the layered configuration of the multilayer structure, the formulations of the respective layers of the multilayer structure, the heater temperature for the heating, and the like.

The draw ratio (product depth (mm)/maximum product diameter (mm)) for the vacuum pressure forming process is typically 0.1 to 3, preferably 0.2 to 2.5, particularly preferably 0.3 to 2, which depends on the shape of the intended bottomed container. If the draw ratio is excessively high, the EVOH composition layer is liable to be cracked. If the draw ratio is excessively low, the side wall is liable to have variations in thickness.

The thickness of the EVOH layer of the multilayer structure after the secondary forming process is typically 0.1 to 500 μm, preferably 0.1 to 250 μm, particularly preferably 0.1 to 100 μm, which depends on the required gas barrier property. If the thickness is excessively small, it will be impossible to provide a sufficient gas barrier property. If the thickness is excessively great, the resulting film tends to be less flexible.

The thickness of the thermoplastic resin layer is typically 0.1 to 5000 μm, preferably 1 to 1000 μm, and the thickness of the adhesive resin layer is typically 0.1 to 500 μm, preferably 1 to 250 μm.

The thickness ratio between the EVOH layer and the adhesive resin layer, and the total thickness ratio between the EVOH layers and the thermoplastic resin layers are not significantly changed before and after the heat-drawing process, and are substantially the same as those defined for the multilayer structure.

The multilayer structure according to the present disclosure is less susceptible to the deterioration in appearance, particularly the reduction in image see-through clarity. This is supposedly because the interface between the EVOH layer and the adjacent adhesive resin layer of the multilayer structure is less liable to be roughened and the minute interface roughening is suppressed which may otherwise deteriorate the appearance. Therefore, the multilayer structure is useful as a material for packaging containers for general foods, condiments such as mayonnaise and dressing, fermented foods such as miso, fat and oil such as salad oil, beverages, cosmetics, medicines and the like.

EXAMPLES

The present disclosure will hereinafter be described specifically by way of examples thereof. However, it should be understood that the present disclosure be not limited to the examples within the scope of the present disclosure.

It is noted that "parts" means "parts by weight" in the following examples.

Preparation of EVOHs for Use in Examples 1 to 7 and Comparative Examples 1 to 4

An EVOH was selected from the following four types of EVOHs, and the selected EVOH and a higher fatty acid zinc salt were dry-blended in proportions shown in Table 1. Thus, 11 EVOHs were prepared for use in Examples 1 to 7 and Comparative Examples 1 to 4.

EVOH1: Having an ethylene content of 29 mol %, a saponification degree of 99.6 mol %, an MFR of 4.0 g/10 minutes (as measured at 210° C. with a load of 2160 g), and a boron content of 90 ppm.

EVOH2: Having an ethylene content of 44 mol %, a saponification degree of 98.5 mol %, an MFR of 4.0 g/10 minutes (as measured at 210° C. with a load of 2160 g), and a boron content of 70 ppm.

EVOH3: Having an ethylene content of 25 mol %, a saponification degree of 99.7 mol %, an MFR of 4.2 g/10 minutes (as measured at 210° C. with a load of 2160 g), and a boron content of 80 ppm.

EVOH4: Having an ethylene content of 38 mol %, a saponification degree of 99.7 mol %, an MFR of 4.1 g/10 minutes (as measured at 210° C. with a load of 2160 g), and a boron content of 250 ppm.

Preparation of Adhesive Resin for Use in Example 7

An adhesive resin PLEXAR PX3236 available from LyondellBasell LLC and having an absorbance ratio ($\alpha/\beta$) of 0.05 and a higher fatty acid zinc salt shown in Table 1 were dry-blended in proportions shown in Table 1. Thus, an adhesive resin to be used in Example 7 was prepared.

Examples 1 to 7 and Comparative Example 1 to 4

Production of Multilayer Structure

In Examples 1 to 6 and Comparative Examples 1 to 4, the EVOH prepared in the aforementioned manner, a linear lower-density polyethylene (LLDPE) UF240 available from Japan Polyethylene Corporation and the adhesive resin PLEXAR PX3236 available from LyondellBasell LLC and having an absorbance ratio ($\alpha/\beta$) of 0.05 were fed into a 3-type 5-layer multilayer coextrusion cast film forming apparatus, whereby 3-type 5-layer multilayer structures (films) each including LLDPE layer/adhesive resin layer/EVOH layer/adhesive resin layer/LLDPE layer were produced under the following conditions by the multilayer coextrusion method. The thicknesses ($\mu$m) of the respective layers of each of the multilayer structures were 37.5/5/15/5/37.5. The temperature of a die of the forming apparatus was set at 210° C.

In Example 7, a multilayer structure was produced in substantially the same manner as in Examples 1 to 6 and Comparative Examples 1 to 4, except that EVOH4 was used alone as the EVOH and the adhesive resin prepared in the aforementioned manner was used as the adhesive resin.

Conditions for Multilayer Coextrusion

Intermediate layer extruder (for EVOH): a 40-mm diameter single-axis extruder (having a barrel temperature of 210° C.)

Upper and lower layer extruders (for LLDPE): 40-mm diameter single-axis extruders (each having a barrel temperature of 210° C.)

Middle upper and lower layer extruders (for adhesive resin): 32-mm diameter single-axis extruders (each having a barrel temperature of 210° C.)

Die: a 3-type 5-layer feed block die (having a die temperature of 210° C.)

Take-up speed: 14 m/minute

Roll temperature: 50° C.

Thickness (X) of Interface Layer Present in Interface Between EVOH Layer and Adhesive Resin Layer The thickness (X) of an interface layer present in an interface between the EVOH layer and the adhesive resin layer of each of the multilayer structures produced in the aforementioned manner was measured in the following manner by means of a scanning electron microscope JSM-6510LA available from JEOL Ltd.

Observation of Section of Multilayer Structure

A piece having a size of about 5 mm× about 5 mm was cut out from each of the multilayer structures produced in the aforementioned manner, and a thicknesswise section of the piece of the multilayer structure including the EVOH layer was polished by an argon ion beam by means of a cross-section polisher IB-09020CP available from JEOL Ltd. Thus, a specimen was prepared for photographing the section of the multilayer structure by means of the SEM. Then, the section of the photographing specimen thus prepared was photographed at a magnification of 5000× by means of the SEM JSM-6510LA available from JEOL Ltd., whereby an image around the interface between the EVOH layer and the adhesive resin layer was obtained.

Measurement of Thickness of Interface Layer Present in Interface Between EVOH Layer and Adhesive Resin Layer In general, when the photographing specimen is to be photographed by means of the SEM, the photographing specimen is pretreated by platinum vapor deposition or the like. Where a portion of the section of the multilayer structure around the interface between the EVOH layer and the adhesive resin layer is photographed by the SEM without performing the vapor deposition, however, the EVOH (bright part) and the adhesive resin (dark part) are contrasted with respect to each other according to the formulations of the respective layers. Thus, the interface between the EVOH layer and the adhesive resin layer of the multilayer structure can be visualized.

By utilizing this characteristic property, the thickness (X) of the interface layer present in the interface between the EVOH layer and the adhesive resin layer was determined based on the image obtained in the above manner. More specifically, a line was drawn perpendicularly to the interface (tangent line) between the EVOH layer (bright part) and the adhesive resin layer (dark part) of the multilayer structure in the image obtained in the above manner, and a brightness distribution along the perpendicular line (determined with the brightness plotted as ordinate and the distance plotted as abscissa) was outputted by utilizing image analysis software Image-J.

In the present disclosure, two inflection points were determined from the brightness distribution, and a distance between the two inflection points on the abscissa was defined as the thickness (X) of the interface layer present in the interface between the EVOH layer and the adhesive resin layer.

Viscosity Increase Rate in Interface Between EVOH Layer and Adhesive Resin Layer The shear viscosities (Pa·s) of the EVOHs and the adhesive resins prepared in the above manner and the EVOH layer/adhesive resin layer stacks were each measured under the following conditions by means of a rotary rheometer MCR301 available from Anton Paar GmbH.

Preparation of Measurement Specimen

The EVOHs and the adhesive resins prepared in the above manner were each heat-pressed into a single-layer sheet having a thickness of 1 mm and a single-layer sheet having a thickness of 0.5 mm at 210° C. by means of a pressure forming apparatus NSF-37 available from Shinto Metal Industries Corporation.

The 1-mm thick single-layer sheets were used for the measurement of the shear viscosities of the EVOHs and the adhesive resins. For the measurement of the shear viscosities of the EVOH layer/adhesive resin layer stacks, the 0.5-mm thick single-layer sheets of the EVOH and the adhesive resin were stacked on the rotary rheometer to form a double layer sheet.

Measurement Conditions

The measurement was performed in a nitrogen atmosphere at a temperature of 210° C. with a strain of 5%, a frequency of 3 rad/s and a preheating period of 10 minutes with the use of a parallel-parallel plate jig having a diameter of 25 mm.

Calculation of Viscosity Increase Rate in Interface Between EVOH Layer and Adhesive Resin Layer The viscosity increase rate in the interface between the EVOH layer and the adhesive resin layer was calculated from the following expressions (6) and (7) based on the results of the measurement.

$$\eta_{EVOH/Tie.calc.} = \phi_{EVOH}\eta_{EVOH} + \phi_{Tie}\eta_{Tie} \quad (6)$$

$$\Delta\eta = \frac{\eta_{EVOH/Tie.exp.} - \eta_{EVOH/Tie.calc.}}{\eta_{EVOH/Tie.calc.}} \times 100 \quad (7)$$

$\Delta_\eta$[%]: The viscosity increase rate in the interface between the EVOH layer and the adhesive resin layer
$\eta_{EVOH/Tie.calc.}$[Pa·s]: The shear viscosity of the EVOH layer/adhesive resin layer stack (theoretical value assuming that no viscosity increase is observed in the interface)
$\eta_{EVOH/Tie.exp.}$[Pa·s]: The shear viscosity of the EVOH layer/adhesive resin layer stack (experimentally obtained value)
$\phi_{EVOH}$: The volume fraction of the EVOH
$\phi_{Tie}$: The volume fraction of the adhesive resin
$\eta_{EVOH}$[Pa·s]: The shear viscosity of the EVOH
$\eta_{Tie}$[Pa·s]: The shear viscosity of the adhesive resin Evaluation for Image Clarity (Image See-Through Clarity The image see-through clarity of each of the multilayer structures was measured in conformity with JIS K7374 "Plastics—Determination of Image Clarity" by a transmissive method. A film test strip was oriented vertically in a film machine direction. An image clarity meter ICM-1 available from Suga Test Instruments Co., Ltd. was used for the measurement. Optical combs respectively having widths of 0.5 mm, 1.0 mm and 2.0 mm were used.

Evaluation for Long-Run Durability

For determination of long-run durability, a torque change was measured while 55 g of each of the EVOHs prepared in the above manner was kneaded at 50 rpm at 250° C. by means of Plastograph EC-plus available from Brabender GmbH. After a lapse of 5 minutes from the start of the kneading, an initial torque value was measured, and a time period required for the torque value to decrease to 20% of the initial torque value was measured. A longer time period indicates a smaller change in melt viscosity and more excellent long-run durability. The evaluation was based on the following criteria:
A: 45 minutes or longer
B: Not shorter than 35 minutes and shorter than 45 minutes
C: Not shorter than 25 minutes and shorter than 35 minutes
D: Shorter than 25 minutes

TABLE 1

|  | Example 1 | Example 2 | Example 3 | Example 4 | Comparative Example 1 | Comparative Example 2 |
| --- | --- | --- | --- | --- | --- | --- |
| Formulation (parts) | | | | | | |
| EVOH1 | 75 | 75 | — | 75 | 75 | 75 |
| EVOH2 | 25 | 25 | 20 | 25 | 25 | 25 |
| EVOH3 | — | — | 80 | — | — | — |
| EVOH4 | — | — | — | — | — | — |
| ΔEt *[1] | 15 | 15 | 19 | 15 | 15 | 15 |
| Higher fatty acid metal salt (proportion) | Zn stearate (600 ppm) | Zn stearate (400 ppm) | Zn stearate (600 ppm) | Zn stearate (1000 ppm) | Zn stearate (100 ppm) | Zn stearate (0 ppm) |
| Thickness (X) (nm) of interface layer present in EVOH layer/adhesive resin layer interface | 228 | 365 | 303 | 222 | 480 | 490 |
| Viscosity increase rate (%) in EVOH layer/adhesive resin layer interface (at 210° C.) | 4.6 | 5.2 | 0.5 | 4.5 | 8.3 | 10.2 |
| Image clarity (image see-through clarity) | | | | | | |
| 2.0-mm wide optical comb | 95.5 | 92.9 | 95.8 | 95.1 | 82.6 | 81 |
| 1.0-mm wide optical comb | 72.7 | 57.2 | 76.2 | 68.3 | 30.1 | 30 |
| 0.5-mm wide optical comb | 62.1 | 42.1 | 66.6 | 56 | 17.7 | 17.6 |
| Long-run durability (at 250° C.) *[2] | B | 3 | B | C | A | A |

TABLE 1-continued

| | Comparative Example 3 | Example 5 | Example 6 | Comparative Example 4 | Example 7 |
|---|---|---|---|---|---|
| Formulation (parts) | | | | | |
| EVOH1 | — | — | — | — | — |
| EVOH2 | — | — | — | — | — |
| EVOH3 | — | — | — | — | — |
| EVOH1 | 100 | 100 | 100 | 100 | 100 |
| ΔEt *[1] | — | — | — | — | — |
| Higher fatty acid metal salt (proportion) | (0 ppm) | Zn laurate (600 ppm) | Zn stearate (600 ppm) | (0 ppm) (Instead, 600 ppm of stearic acid was added.) | (0 ppm) (Instead, 600 ppm of Zn stearate was added to adhesive resin.) |
| Thickness (X) (nm) of interface layer present in EVOH layer/adhesive resin layer interface | 465 | 260 | 302 | 425 | 298 |
| Viscosity increase rate (%) in EVOH layer/adhesive resin layer interface (at 210° C.) | 17.1 | 5.4 | 6.4 | 12.7 | 6.2 |
| Image clarity (image see-through clarity) | | | | | |
| 2.0-mm wide optical comb | 81.5 | 96.2 | 96.5 | 81.4 | 97.2 |
| 1.0-mm wide optical comb | 30.6 | 73.8 | 76.7 | 31.5 | 87.2 |
| 0.5-mm wide optical comb | 19.7 | 70.9 | 67.7 | 20.5 | 79.9 |
| Long-run durability (at 250° C.) *[2] | A | A | A | A | A |

*[1] ΔEt is a difference in ethylene content (mol %).
*[2] Evaluation based on a time period required for the torque value to decrease to 20% of the initial torque value.

The above results indicate that the multilayer structures of Examples 1 to 7 produced by controlling the thickness (X) of the interface layer present in the interface between the EVOH layer and the adhesive resin layer within the predetermined range at 210° C. and controlling the viscosity increase rate in the interface between the EVOH layer and the adhesive resin layer within the predetermined range at 210° C. were excellent in long-run durability, and were less susceptible to the deterioration in appearance, particularly the reduction in image see-through clarity.

While specific forms of the embodiments of the present disclosure have been shown in the aforementioned inventive examples, the inventive examples are merely illustrative of the disclosure but not limitative of the disclosure. It is contemplated that various modifications apparent to those skilled in the art could be made within the scope of the disclosure.

The multilayer structure according to the present disclosure is less susceptible to the deterioration in appearance, particularly the reduction in image see-through clarity. This is supposedly because the interface between the EVOH layer and the adjacent adhesive resin layer of the multilayer structure is less liable to be roughened and the minute interface roughening is suppressed which may otherwise deteriorate the appearance. Therefore, the multilayer structure according to the present disclosure is useful as a material for various packaging containers for general foods, condiments such as mayonnaise and dressing, fermented foods such as miso, fat and oil such as salad oil, beverages, cosmetics, medicines and the like.

The invention claimed is:

1. A multilayer structure comprising:
   a layer containing a saponified ethylene-vinyl ester copolymer;
   a layer of a thermoplastic resin other than the saponified ethylene-vinyl ester copolymer provided on at least one side of the saponified ethylene-vinyl ester copolymer-containing layer; and
   an adhesive resin layer provided between the saponified ethylene-vinyl ester copolymer-containing layer and the thermoplastic resin layer;
   wherein an interface layer having a thickness (X) of 50 to 400 nm is present in an interface between the saponified ethylene-vinyl ester copolymer-containing layer and the adhesive resin layer, and
   wherein the adhesive resin layer has an absorbance ratio (α/β) of an absorbance (α) measured at around 1710 $cm^{-1}$ and an absorbance (β) measured at around 1450 $cm^{-1}$ in a range of from 0.005 to 0.4 analyzed by means of an infrared spectrometer (IR).

2. The multilayer structure according to claim 1, wherein the saponified ethylene-vinyl ester copolymer is a mixture of two or more saponified ethylene-vinyl ester copolymers having different ethylene structural unit contents.

3. The multilayer structure according to claim 2, wherein the two or more saponified ethylene-vinyl ester copolymers have a maximum ethylene structural unit content and a minimum ethylene structural unit content which are different from each other by a difference (ΔEt) of 10 to 25 mol %.

4. The multilayer structure according to claim 1, wherein the saponified ethylene-vinyl ester copolymer-containing layer further contains a zinc salt of a higher fatty acid.

5. The multilayer structure according to claim 1, wherein the saponified ethylene-vinyl ester copolymer-containing layer further contains 350 to 800 ppm of a zinc salt of a higher fatty acid based on an amount of the saponified ethylene-vinyl ester copolymer.

* * * * *